United States Patent
Ohkubo et al.

(10) Patent No.: US 8,430,613 B2
(45) Date of Patent: Apr. 30, 2013

(54) BLIND RIVET

(75) Inventors: Yutaka Ohkubo, Toyohashi (JP); Tooru Fujita, Toyohashi (JP); Yasumasa Matsunaga, Toyohashi (JP); Takashi Mizuno, Toyohashi (JP)

(73) Assignee: Newfrey LLC, Newark, DE (US)

( * ) Notice: Subject to any disclaimer, the term of this patent is extended or adjusted under 35 U.S.C. 154(b) by 251 days.

(21) Appl. No.: 13/015,160

(22) Filed: Jan. 27, 2011

(65) Prior Publication Data

US 2011/0188961 A1 Aug. 4, 2011

(30) Foreign Application Priority Data

Jan. 29, 2010 (JP) .................................. 2010-018266

(51) Int. Cl.
*F16B 13/04* (2006.01)

(52) U.S. Cl.
USPC ............................................ 411/43; 411/360

(58) Field of Classification Search .............. 411/40–43, 411/34, 45, 361, 360
See application file for complete search history.

(56) References Cited

U.S. PATENT DOCUMENTS

| | | | | |
|---|---|---|---|---|
| 3,515,028 A | * | 6/1970 | Patton | |
| 4,846,611 A | * | 7/1989 | Sadri et al. | 411/43 |
| 4,909,687 A | * | 3/1990 | Bradley et al. | 411/43 |
| 4,969,785 A | * | 11/1990 | Wright | 411/43 |
| 4,990,042 A | * | 2/1991 | Szayer et al. | 411/29 |
| 6,299,398 B1 | * | 10/2001 | Shinjo | 411/43 |
| 6,659,699 B2 | * | 12/2003 | Stoewer et al. | 411/361 |
| 6,834,420 B1 | * | 12/2004 | Rothe et al. | 29/243.526 |

FOREIGN PATENT DOCUMENTS

| | | |
|---|---|---|
| EP | 0639719 A | 2/1995 |
| JP | 2009-041699 A | 2/2009 |

* cited by examiner

*Primary Examiner* — Gary Estremsky
(74) *Attorney, Agent, or Firm* — Michael P. Leary

(57) ABSTRACT

A mandrel has an anti-dropping-off portion that is formed between a head and a breakable portion thereof. In the anti-dropping-off portion, a plurality of latching ridges is formed which have peaks that protrude outwardly in the radial direction and frictionally engage with the inner wall surface of a sleeve. The latching ridges are formed in the outer surface of the portion of the mandrel that is between the head and breakable portion thereof, so as to be diagonal relative to the circumferential direction of the outer surface of the mandrel and to cross each other, with the peaks thereof formed in a twill pattern protruding out from the outer surface of that mandrel portion.

6 Claims, 5 Drawing Sheets

BLIND RIVET

CROSS-REFERENCE TO RELATED APPLICATIONS

This application claims priority from Japanese Patent Application No. 2010-018266, filed on Jan. 29, 2010, the disclosure of which is incorporated herein by reference.

BACKGROUND OF THE INVENTION

This invention relates to a blind rivet, such as, for example, a blind rivet that is fastened to a member being fastened, with which the rivet body is inserted into an attachment hole in the member being fastened, such as a wall or the like, forming a closed space, and the end of a sleeve of the rivet body is deformed outwardly in the radial direction thereof, whereupon the member being fastened is clamped between that deformed sleeve portion and a flange of the rivet body.

Blind rivets, each of which comprises a hollow rivet body comprising a sleeve and a flange at one end of that sleeve, and a mandrel that is longer than the rivet body passing through the rivet body so that a grip portion extends out from the flange, are well known. An advantage thereof is the ability to fasten one member being fastened (such as a panel, for example) and another member being fastened (such as a member being attached, for example), from only one side. The mandrel has an outer diameter that allows passage through the rivet body, is formed in a rod shape, longer than the rivet body, and is provided with a grip portion and a head at the opposite end. The mandrel is assembled together with the rivet body such that the mandrel head is disposed adjacent to the end of the sleeve opposite the flange and such that the grip portion thereof extends out from the flange. In the portion of the mandrel that is accommodated inside the sleeve of the rivet body at a position separated from the head, a breakable portion of small diameter is formed, the mandrel being formed so that, when its grip portion is forcefully pulled out from the flange until the breakable portion breaks, its head widens the other end of the sleeve and its adjacent portion, outwardly in the radial direction, whereupon the member(s) being fastened is/are clamped between that deformed sleeve portion and the flange, and the blind rivet is fastened to the member(s) being fastened.

After the fastening operation, the portion of the mandrel on the grip end that is breakable and has broken is pulled in by a fastening tool and recovered in the fastening tool, but the other portion of the mandrel, that is, the portion of the mandrel including the head, extending to the breakable portion, remains in the rivet body. Therefore, there is a danger that this remaining mandrel portion will fall out of the rivet body. In cases where the blind rivet is fastened to a member being fastened that has a closed space, when the remaining mandrel portion falls out of the rivet body, that remaining mandrel portion rolls around inside that space, producing noise and even damaging the inner wall surface, which is undesirable.

BACKGROUND LITERATURE

Patent Literature 1: [Unexamined Japanese Patent Application] No. 2009-041699.
Patent Literature 2: European Patent Application No. 0639719, specification.

SUMMARY OF THE INVENTION

The blind rivet described in Patent Literature 1 has a configuration whereby the mandrel portion remaining in the rivet body is prevented from falling out after the mandrel breaks. The blind rivet 1 described in Patent Literature 1 shall now be described with reference to FIGS. 1 (A) and (B). The blind rivet 1 comprises a mandrel 2 and a rivet body 3. The mandrel rivet 2 has a head 5 at one of its ends and a grip portion 6 at the other end. The rivet body 3 has a sleeve 7 and a flange 9 that is formed at one end of the sleeve 7, that is the end opposite the head 5. In the portion of the mandrel 2 positioned away from the head 5 and accommodated inside the sleeve 7, a breakable portion 10 of small diameter is formed. The mandrel 2 also has an anti-dropping-off portion 11 that is formed between the head 5 and the breakable portion 10. In the anti-dropping-off portion 11, there is a top part of larger diameter than the inner diameter of the sleeve 7, formed so as to frictionally engage the inner wall surface of the sleeve 7, and that top part is formed with latching ridges 13 that extend in the outer circumferential direction of the mandrel. The anti-dropping-off portion is formed so that, after the grip portion 6 of the mandrel 2 is forcefully pulled out so as to break from the breakable portion 10, the latching ridges 13 of the anti-dropping-off portion 11 are pulled up to the position of the flange 9, so that the head 5 widens the end of the sleeve 7 and the portion adjacent thereto, outwardly in the radial direction, whereupon the member being fastened is clamped between the deformed sleeve portion and the flange 9, and the blind rivet is fastened to the member being fastened. The portion of the mandrel 2 extending to the breakable portion 10 and inclusive of the head 5 is held so as to remain inside the rivet body 3 because the anti-dropping-off portion 11 engages the inner wall surface of the flange 9. Numeral 14 in FIG. 1 (A) designates a member being fastened such as a panel.

As diagrammed in FIG. 1 (B), the latching ridges 13 of the anti-dropping-off portion 11 are formed in the outer surface of the mandrel between three parallel grooves 15 that are formed so as to encircle the outer circumferential surface in the outer circumferential direction. In order for the portion of the mandrel 2 containing the head 5 that remains in the rivet body 3 to be held securely and not drop out of the rivet body 3, it is preferable that the latching ridges 13 engage the inner wall surface of the flange 9 of high rigidity that extends out in the radial direction rather than the inner wall surface of the sleeve 7 of low rigidity, the thickness of which is thin in the radial direction. However, the positions of the latching ridges at the time of fastening will change, that is, be different inside the rivet body depending on the thickness of the member being fastened. In order to ensure that the latching ridges 13 definitely engage the inner wall surface of the flange 9 irrespective of the thickness of the member being fastened, the number of the latching ridges 13 may be increased. When that is done, however, the manufacturing cost of the mandrel 2 increases and the rigidity of the mandrel 2 decreases, causing the risk that the fastening force diminishes.

Also, because the outer diameter of the peaks of the latching ridges 13 are formed at a diameter slightly larger than the inner diameter of the sleeve in order to achieve frictional engagement with the inner wall surface of the sleeve 7, when the mandrel 2 is assembled together with the rivet body 3, the inner wall surface of the sleeve between the head 5 and the anti-dropping-off portion 11 is cut by the peaks of the latching ridges 13 such that the inner diameter of the sleeve 7 increases. For that reason, as diagrammed in FIG. 1 (B), a gap 17 is formed between the inner wall surface of the sleeve 7 and the outer surface of the mandrel 2, between the head 5 and the anti-dropping off portion 11. Due to this gap 17, when the mandrel 2 is forcefully pulled in, the head 5 will readily tilt relative to the axis of the sleeve 7, causing the risk that the head 5 will come up against the end surface of the sleeve 7 in a tilted state. When the head 5 is pressed evenly against the sleeve end surface, the sleeve end surface and the portion adjacent thereto are deformed evenly, outwardly in the radial direction, in the circumferential direction, and the blind rivet is then well fastened to the member being fastened. If the head 5 comes up against the end surface of the sleeve 7 in a tilted state, there is a danger that the head 5 will not be pressed evenly against the sleeve end surface, so that the sleeve end surface and the portion adjacent thereto will be deformed unevenly, outwardly in the radial direction, in the circumferential direction, so as to lead to a poor fastening of the blind rivet to the member being fastened.

With the blind rivet of Patent Literature 2, a plurality of spiral latching ridges (webs) is formed between the head and the breakable portion of the mandrel, parallel and inclined relative to the circumferential direction. As indicated by the two arrows in FIG. 4 of the Patent Literature, after the mandrel is pulled in, the mandrel is also turned about the axis of the mandrel, and the plurality of latching ridges is made to bite into the inner wall surface of the sleeve while forming spiral grooves therein; the mandrel portion remaining after breakage is then secured to the sleeve, a broach part of larger diameter than the latching ridges is provided in the portion of the mandrel between the latching ridges and the head, and the spiral grooves made by the latching ridges are deformed in the sleeve end surface such that the mandrel is prevented from falling out even if it is turned in the reverse direction about the axis thereof. With the blind rivet of Patent Literature 2, the portion of the mandrel remaining after breakage is made to bite into the inner wall surface of the sleeve, strengthening the fastening of the blind rivet. However, during the fastening operation, after forcefully pulling the breakable portion in so as to break, it is necessary to perform a further turning operation, making the fastening operation complex. It is also necessary to form the broach part in the mandrel for deforming the spiral grooves on the inner wall surface of the sleeve made by the latching ridges, thus increasing the manufacturing cost of the mandrel.

Accordingly, an object of the present invention is to provide a blind rivet whereby the mandrel remaining in the rivet body after breakage is prevented from falling out, mandrel rigidity and fastening force are maintained at high levels without increasing the manufacturing cost of the mandrel, and the fastening is maintained in good order, assuring the head presses evenly against the end surface of the sleeve.

SUMMARY OF THE INVENTION

In order to achieve this and other objects of the present invention, the blind rivet according to the present invention has a hollow rivet body comprising a tubular sleeve and a flange formed at one end of that sleeve, and a mandrel with a head of a diameter larger than the inner diameter of the sleeve of that rivet body, also having an outer diameter that will pass through the rivet body, shaped as a rod, longer than the rivet body, and that is provided with a grip portion at the opposite end from the head; the mandrel is assembled together with the rivet body so that the head is placed adjacent to the other end of the sleeve and so that the grip portion extends out from the flange; a breakable portion of small diameter is formed in the mandrel in its portion accommodated inside the sleeve, at a position separated from the head; when the grip portion is forcefully pulled out from the flange until its breakable portion breaks, the head deforms the other end of the sleeve and the portion adjacent thereto, so as to widen them outwardly in the radial direction; then a member being fastened is clamped between the deformed sleeve portion and the flange, and the blind rivet is fastened to the member being fastened; wherein the mandrel has an anti-dropping-off portion formed between the head and the breakable portion; in the anti-dropping-off portion, a plurality of latching ridges is formed having peaks protruding slightly outwardly in the radial direction from the inner diameter of the sleeve so as to frictionally engage the inner wall surface of the sleeve; the plurality of latching ridges is formed in the outer surface of the mandrel portion between the head and the breakable portion, diagonally relative to the circumferential direction of the outer surface of the mandrel, so as mutually to cross each other with the peaks thereof formed in a twill pattern protruding out from the outer surface of that mandrel portion; then, by the forceful pulling out of the grip portion, the peaks of the latching ridges engage the inner wall surface of the flange, even after the breakable portion has broken, and the portion of the mandrel remaining in the rivet body is held inside that rivet body.

As per the foregoing, the plurality of latching ridges of the anti-dropping-off portion is formed in the outer surface of the mandrel between the head and the breakable portion so as to be diagonal relative to the circumferential direction of the outer surface of the mandrel and to mutually cross each other, with the peaks thereof formed in a twill pattern protruding out from the outer surface of the mandrel portion; they then engage the inner wall surface of the sleeve so that the mandrel is held to the rivet body so as not to wobble, and even after the breakable portion has been broken by the grip portion being forcefully pulled out, the peaks of the latching ridges engage not only the sleeve of the rivet body but also the inner wall surface of the flange. Therefore, in the pulling-out operation, the mandrel head is evenly pressed against the end surface of the sleeve such that the deformation of the sleeve is done uniformly, and, moreover, the portion of the mandrel extending to the breakable portion, inclusive of the head, which remains in the rivet body, is definitely held inside the rivet body, irrespective of whether the member being fastened is of large or small thickness, the portion of the mandrel where the latching ridges are enhances the force by which the blind rivet is fastened to the member being fastened, maintaining and reinforcing the expanded shape of the expansion-deformed portion of the sleeve of the rivet body, and high fastening force is maintained for a longer period. The remaining mandrel portion, moreover, is secured to the rivet body; in this way, even if the blind rivet is subjected to vibration by the member being fastened, the mandrel portion will not move inside the rivet body, so no noise is produced.

Accordingly, this eliminates the disadvantage of the need to form many parallel latching ridges in order to cope with differences in the thickness of the members being fastened in cases where the latching ridges extend in the circumferential direction; mandrel rigidity is maintained without increasing mandrel manufacturing costs, the blind rivet fastening force is maintained at a high level, and, during the operation of pulling the mandrel in, the latching ridges of the mandrel engage the inner wall surface of the sleeve without wobbling. Consequently, this assures that the head is pressed uniformly against the end surface of the sleeve, and the blind rivet fastening is maintained in good order. The latching ridges of the anti-dropping-off portion positively engage the inner wall surface in the hollow portion of the flange of the rivet body, even when there are differences in the thickness of the member being fastened; consequently, the range of adaptability to changes in the thickness of the member being fastened is greater.

In the blind rivet described above, the latching ridges of the anti-dropping-off portion are formed so that the twill pattern made by the peaks covers the outer surface of the mandrel portion from an intermediate position between the head and the breakable portion to a position adjacent to the head. Consequently, wobble at a position adjacent to the head is constrained by the peaks of the latching ridges, the head is evenly pressed against the end surface of the sleeve, the sleeve end surface and portion adjacent thereto are uniformly deformed, outwardly in the radial direction, and in the circumferential direction, preventing failure of fastening to the member being fastened. In the blind rivet described above, moreover, the latching ridges of the anti-dropping-off portion should preferably be formed so that the twill pattern made by the peaks cover the outer surface of the mandrel portion from a position adjacent to the breakable portion to a position adjacent to the head. Consequently, the peaks of the latching ridges constrain wobble at positions adjacent to the head, the head is evenly pressed against the end surface of the sleeve, the sleeve end surface and the portion adjacent thereto are uniformly deformed, outwardly in the radial direction, and in the circumferential direction, failure of the fastening of the blind rivet to the member being fastened is prevented, the range of the latching ridges of the anti-dropping-off portion is greater and the range of adaptability to changes in the thickness of the member being fastened is made even greater. The latching ridges are such that the portion of the mandrel between the head and the breakable portion is formed by twill (or diamond-shaped) knurling machining. Accordingly, a blind rivet in which remaining mandrel fallout is prevented merely by subjecting the mandrel to twill knurling machining can be provided at low cost.

In the blind rivet described above, in the mandrel head, at a position opposing the other end of the sleeve, a plurality of cutting blades for making incisions in the longitudinal direction, from the other end of the sleeve, is formed at intervals. In this way, a configuration can be effected such that, when the breakable portion breaks due to the forceful pulling out of the mandrel grip portion, the cutting blades can, while opening the other end of the sleeve in the longitudinal direction, deform the other end of the sleeve and the portion adjacent thereto so as to widen them outwardly in the radial direction. In another case, the head of the mandrel may be formed in a shape that, when the breakable portion breaks due to the forceful pulling out of the mandrel grip portion, deforms the other end of the sleeve and the portion adjacent thereto so as to expand outwardly in the radial direction.

EXEMPLARY EMBODIMENTS OF THE INVENTION

Figure 2:
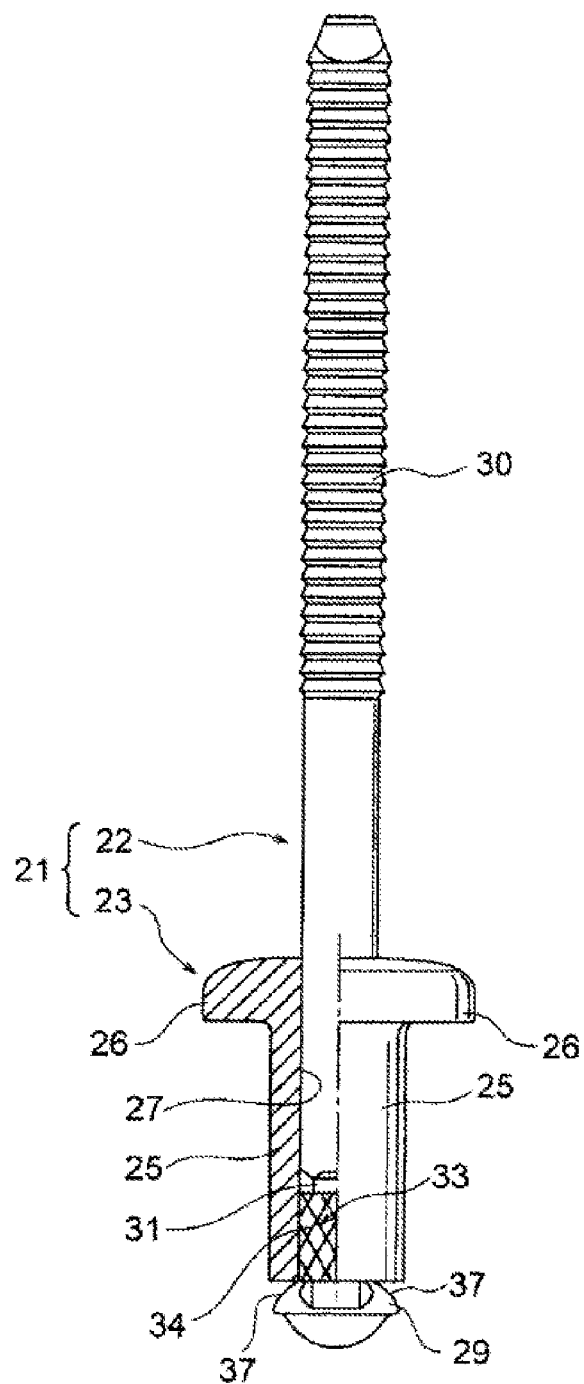
FIG. 2 is a front elevation of a blind rivet relating to one embodiment of the present invention, with the rivet body thereof shown as half cut-away.
Figure 3:
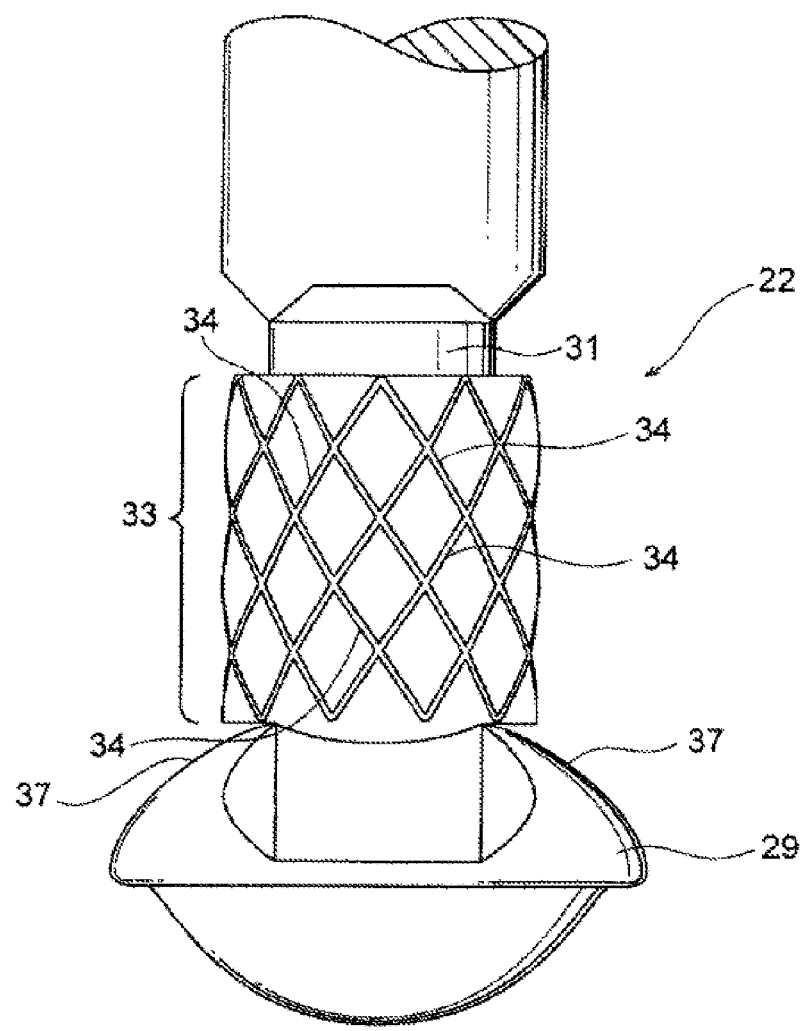
FIG. 3 is an enlarged front elevation detail view of a blind rivet relating to the present invention of FIG. 2, showing the mandrel head and anti-dropping-off portion.
Figure 4:
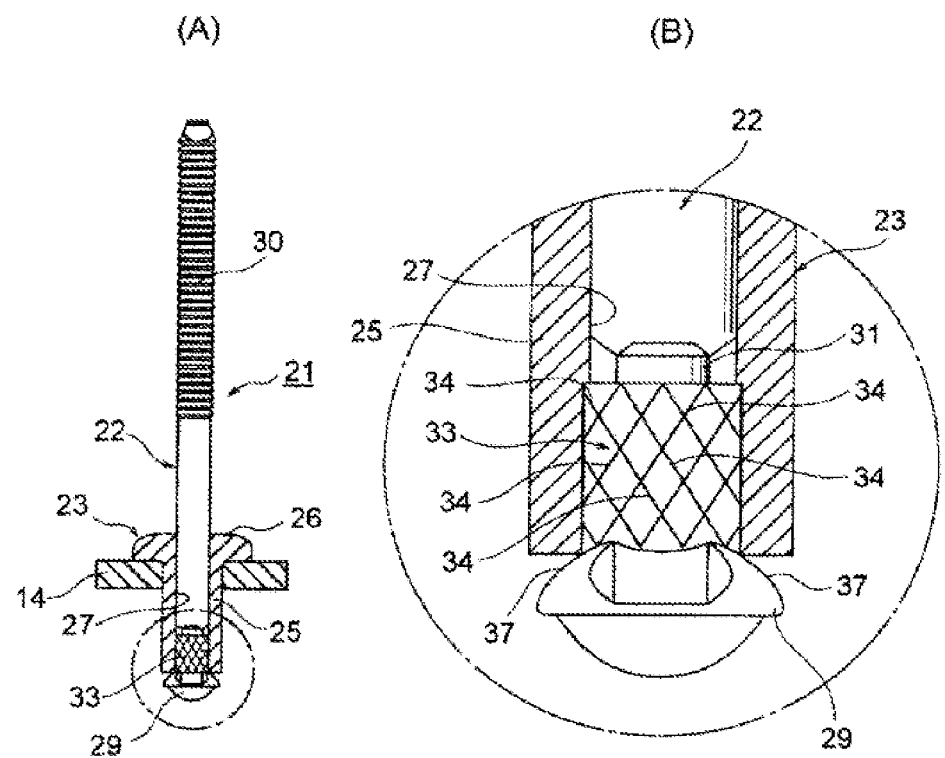
FIG. 4 diagrams a blind rivet relating to FIG. 2 of the present invention, where (A) is a partially cut-away front elevation thereof, showing the rivet body in cross-section, and (B) is an enlarged view of the encircled portion in (A).
Figure 5:
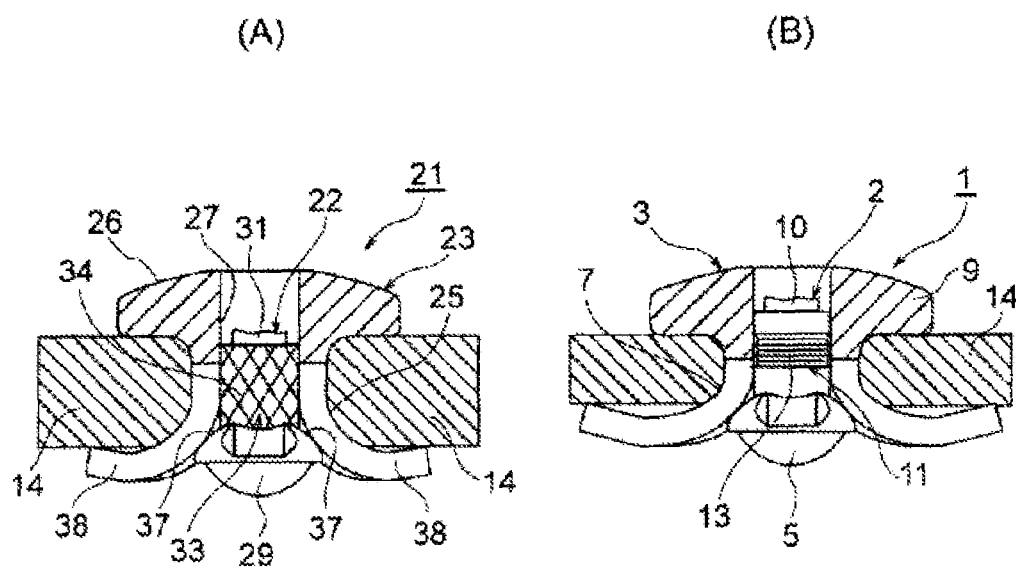
FIG. 5 (A) is a partially cut-away front elevation of a blind rivet relating to FIG. 2 of the present invention in the fastened state, while (B) is a partially cut-away front elevation of the known blind rivet of FIG. 1 in the fastened state.

A blind rivet 21 relating to a first embodiment of the present invention shall now be described with reference to FIGS. 2 to 5. In FIG. 2, the blind rivet 21 relating to one embodiment of the present invention is comprised of a mandrel 22 and a rivet body 23, with the mandrel 22 assembled together with the rivet body 23. FIG. 3 diagrams the portion of the mandrel 22 near its head prior to assembly. FIGS. 4 (A) and (B) diagram the relationship between the assembled blind rivet 21 and mandrel 22. FIG. 5 (A) diagrams the state of the blind rivet 21 relating to the one embodiment of the present invention when fastened to a member being fastened, while FIG. 5 (B) diagrams the state of the known blind rivet 1 described in Patent Literature 1 when fastened to a member being fastened.

In FIGS. 2 and 3, the mandrel 22 is formed of a hard metal in a cylindrical rod shape that is longer than the rivet body 23, being made, for example, of hard steel wire. In FIG. 2, the rivet body 23 is formed of metal in a hollow tubular shape, of a material softer than that of the mandrel 22, such as, for example, a soft metallic material like aluminum or aluminum alloy or the like. In addition to those metals, the rivet body may also be made of iron, an iron alloy, stainless steel, copper or a copper alloy. As diagrammed in FIG. 2, the blind rivet 21 is assembled such that the the mandrel 22 is passed through the hollow rivet body 23 so as to extend out from the rivet body 23.

As diagrammed in FIG. 2, the rivet body 23 is comprised of a hollow sleeve 25 and a flange 26 of large diameter at one end of the sleeve 25, the whole of which is made hollow in order to accommodate the mandrel 22 inside the hollow part 27. The inner diameter of the hollow part 27 of the sleeve 25 and flange 26 is established so as to allow passage therethrough of the mandrel 22. The thickness of the flange 26 (that is, its length in the axial direction of the rivet body 23) should preferably be established at a thickness whereby the mandrel portion remaining inside the rivet body 23 after the mandrel 22 has been forcefully pulled out and broken at the breakable portion will not protrude out from the flange 26. As will be described, when the mandrel 22 is forcefully pulled out of the rivet body 23 until it breaks at the breakable portion 31, the sleeve 25 is deformed (cf. FIG. 5 (A)), but the flange 26 portion is not deformed because of its high rigidity, as it is wide in the radial direction; in this way, the flange 26 portion becomes a non-deforming portion that will not be deformed even if the diameter of the hollow part 27 of the flange 26 is deformed.

A mandrel head 29 is formed at one end of the mandrel 22, of larger diameter than the inner diameter of the end of the rivet body sleeve 25 opposite the flange 26. The length of the mandrel 22, as diagrammed in FIG. 2, is made considerably longer than the sleeve 25 of the rivet body 23, so as to protrude out from the flange 26 of the rivet body 23, and its protruding portion is formed as a grip portion 30 which can be gripped by a gripping member at the tip end of a fastening tool (not shown in the drawings). In the grip portion 30 are formed latching grooves, in multiple stages, so that the grip portion will not pull out of the grip of the gripping member of the fastening tool. The tip end of the mandrel 22 is formed so as to be tapered to facilitate insertion into the fastening tool.

In the portion of the mandrel 22 accommodated in the sleeve 25, a breakable portion 31 is formed of smaller diameter than the other portion. The breakable portion 31 is a portion that will break when a certain pulling-out force is exceeded when the grip portion 30 of the mandrel 22 is forcefully pulled out from the flange 26 with the fastening tool. The pulling-out force up until just before breakage is a force that is applied to the end surface of the sleeve 25 of the rivet body 23 from the large-diameter portion of the head 29, that being a force that effects deformation in order to widen the end of the sleeve 25 and the portion adjacent thereto outwardly in the radial direction. Accordingly, the break resistance force of the breakable portion 31 is determined by the force that causes the sleeve 25 of the rivet body 23 to deform. After breakage at the breakable portion 31, the mandrel portion being gripped by the fastening tool (that being mainly the grip portion 30) will be held in the fastening tool and recovered in a recovery box of the fastening tool. The position of the breakable portion 31 may be any position so long as it is inside the rivet body 23, but if it is formed at a position midway along the sleeve 25, as represented in the diagrammed embodiment, then almost all portions of the mandrel 22 can be recovered so that a high recovery rate can be maintained. However, as will be described, an anti-dropping-off portion 33 is formed in the portion of the mandrel that is between the breakable portion 31 and the head 29, for which anti-dropping-off portion 33 a certain length is required so that, after the mandrel 22 breaks, the portion of the mandrel remaining in the rivet body 23 (the portion of the mandrel extending from the head 29 to the breakable portion 31, inclusive of the head 29) will be prevented from dropping out of the rivet body 23. For that reason, the position of the breakable portion 31 is established at a position midway from the end of the sleeve 25 to the flange 26, but slightly nearer to the head 29, as diagrammed in FIG. 2.

The mandrel 22 shall now be further described. The mandrel 22, prior to assembly in the rivet body 23 (that is, in the state diagrammed in FIG. 3), has the anti-dropping-off portion 33 formed between the head 29 and the breakable portion 31. This anti-dropping-off portion 33 prevents the portion of the mandrel remaining in the rivet body 23 after breakage of the mandrel 22 at the breakable portion 31 (that being the portion of the mandrel extending from the head 29 to the breakable portion 31, inclusive of the head 29) from dropping out of the rivet body 23. Consequently, any production of noise when the remaining mandrel portion drops out is also prevented.

In the anti-dropping-off portion 33, a plurality of linear latching ridges 34 is formed with peaks that are linearly continuous and protrude slightly outwardly in the radial direction from the inner diameter of the sleeve 25, so as to frictionally engage the inner wall surface of the sleeve 25. The plurality of latching ridges 34 extends, in the outer surface of the mandrel portion between the head 29 and the breakable portion 31, diagonally relative to the circumferential direction of the outer surface of the mandrel (that direction referring to the circumferential direction of the outer surface of the mandrel that is in a plane perpendicular to the axis of the mandrel 22), (diagonally, that is, meaning at a certain angle relative to the aforesaid circumferential direction). The plurality of latching ridges 34, moreover, is formed so that they mutually cross to form a twill pattern (see FIGS. 2 to 4) such that the peaks thereof protrude out in the radial direction from the outer surface of the mandrel 22.

The position of the anti-dropping-off portion 33 is a position by which, prior to mandrel 22 breakage, the latching ridges 34 exist from an intermediate position between the head 29 and the breakable portion 31 to a position adjacent to the head 29, determined such that, after mandrel breakage, the mandrel portion remaining in the rivet body 23 will be at a position corresponding to the hollow part 27 of the flange 26 and its vicinity. As a consequence of the latching ridges 34 extending out to a position adjacent to the head 29, during the operation of pulling out the mandrel 22 prior to breaking the mandrel 22, wobble at a position adjacent to the head 29 is constrained by the peaks of the latching ridges 34 so that wobble is prevented; in this way, the head 29 is evenly pressed against the end surface of the sleeve 25, the end surface of the sleeve 25 and the portion adjacent thereto are uniformly deformed outwardly in the radial direction, and in the circumferential direction, and failure of the fastening of the rivet body 23 to a member being fastened is prevented. Also, as a consequence of the latching ridges 34 extending from an intermediate position between the head 29 and the breakable portion 31 to a position adjacent to the head 29, after the mandrel breaks, the latching ridges 34 frictionally engage the inner wall surface of the hollow portion of the flange 26 that is the non-deforming portion of the rivet body 23, thus preventing the portion of the mandrel remaining in the rivet body 23 from falling out of the rivet body 23, thereby also assuring engagement of the peaks of the latching ridges 34 in the inner wall surface of the hollow part 27 of the rivet body 23, maintaining the fastening strength of the blind rivet 21 at a high level, and broadening the range of adaptability to changes in thickness of the member being fastened. As diagrammed in FIGS. 2 to 4, the latching ridges 34 of the anti-dropping-off portion 33 should preferably be formed so that the twill pattern made by the peaks covers the outer surface of the mandrel 22 portion, namely the entire outer surface of the mandrel portion extending from a position adjacent to the head 29 to a position adjacent to the breakable portion 31. Consequently, the range whereby the latching ridges 34 can engage the inner wall surface of the flange 26 of the rivet body 23 becomes even greater, and when the blind rivet 21 is fastened to a member being fastened, the range of adaptability to changes in the thickness of the member being fastened becomes even broader.

The latching ridges 34 can be formed by subjecting the portion of the mandrel 22 between the head 29 and the breakable portion 31 to twill (or diamond-shaped) burling machining. Consequently, all that need be done is to effect twill (or diamond-shaped) burling machining at a certain location (the anti-dropping-off portion 33 formed by multiple latching ridges 34); in this way, falling out of the remaining mandrel portion after breakage is prevented by the anti-dropping-off portion 33, and a blind rivet 21 can be provided at low cost.

As described above, the peaks of the latching ridges 34 are formed to protrude slightly outwardly in the radial direction from the inner diameter of the sleeve 25, so as to frictionally engage the inner wall surface of the sleeve 25. Also, as diagrammed in FIG. 3, the peaks of the latching ridges 34 are formed in a twill pattern that covers the entire outer surface of the portion of the mandrel from a position adjacent to the head 29 to a position adjacent to the breakable portion 31. Consequently, after the mandrel 22 breaks, the latching ridges 34 frictionally engage the inner wall surface of the hollow part 27 of the flange 26, the portion of the mandrel remaining in the rivet body 23 (that is, the mandrel portion extending from the head 29 to the breakable portion 31, which includes the anti-dropping-off portion 33) is prevented from dropping out of the rivet body 23, engagement of the peaks of the latching ridges 34 in the inner wall surface of the hollow part 27 of the flange 26 of the rivet body 23 is assured, the fastening strength of the blind rivet 21 is maintained at a high level, and the range of adaptability to changes in the thickness of the member being fastened is broadened, while, in the forceful pulling-out operation when breaking the mandrel 22 at the breakable portion 31, wobble at a position adjacent to the head 29 is constrained by the peaks of the latching ridges 34 such that wobble is prevented. Consequently, the head 19 is evenly pressed against the end surface of the sleeve 25, the sleeve end surface and portion adjacent thereto are uniformly deformed outwardly in the radial direction, in the circumferential direction, preventing failure of the fastening of the blind rivet 21 to the member being fastened.

In the embodiment diagrammed in the Drawings, in the head 29 of the mandrel 22 of the blind rivet 21, in the surface opposite the end surface of the sleeve 25 of the rivet body 23, a plurality of cutting blades 37 extending diagonally in the radial direction is formed at intervals in the circumferential direction. This plurality of cutting blades 37 cuts open the opposing end surface of the sleeve 25 by the strong pulling-out force from the flange 26 that breaks the mandrel 22 at its breakable portion 31 and furthermore splits the sleeve 25 in the longitudinal direction in order to divide it into a number of divisions equal to the number of cutting blades 37; those divided portions of the sleeve 25 are then opened outwardly in the radial direction to effect further deformation to an arch shape and strongly engage the tip ends of those divided portions with the surface of the member being fastened. Also, instead of or in addition to such cutting blades 37, dividing grooves extending longitudinally may be formed inside the sleeve 25. A blind rivet whose sleeve 25 is split and deformed into arch shapes in this manner is called a peel type blind rivet and affords the advantage that a member being fastened can be fastened without damage even when it is a member made of soft material such as plastic.

In an alternative to the blind rivet relating to the embodiment diagrammed in the Drawings and described above, the mandrel head may be shaped such that, when the breakable portion is broken by the forceful pulling out of the grip portion of the mandrel, the other end of the sleeve and the portion adjacent thereto are deformed so as to expand outwardly in the radial direction. The shape of the mandrel head of such a known blind rivet is described, for example, in Japanese Patent Application No. 2003-214414. No cutting blades are provided in this mandrel head. Alternatively, the blind rivet may be one in which the rivet body is deformed in the flange direction so as to expand.

The operation of fastening the blind rivet 21 to a member being fastened 14 shall now be described with reference to FIGS. 4 (A) and (B) and FIG. 5 (A). The member being fastened 14, moreover, may be of a hard material such as a metal, or may be a soft member made of plastic or the like, and the member being fastened that is fastened by the blind rivet 21 may be one member or a plurality of members. When there is a plurality of members being fastened, the members being fastened are firmly joined together by the blind rivet 21. In the fastening operation, the grip portion 30 of the blind rivet 21 is held by the fastening tool (not shown), and the head 29 and the sleeve 25 are inserted into an attachment hole in the member being fastened 14 and positioned so that the flange 26 comes up against the member being fastened 14. In this state, the mandrel 22 is pulled out of the flange 26 with a forceful pulling-out force that breaks the mandrel 22 at its breakable portion 31. As the mandrel 22 is being pulled out, the outer diameter of the latching ridges 34 of the anti-dropping-off portion 33, even if larger than the inner diameter of the sleeve 25 of the rivet body 23, is pressed inside the sleeve 25. In the case of the blind rivet 21 diagrammed in the Drawings, due to the pulling out of the mandrel 22, the cutting blades 37 of the head 29 split the sleeve 25 in the longitudinal direction, dividing it into a number of divisions corresponding to the number of cutting blades 37; the divided portions of the sleeve 25 are then opened outwardly in the radial direction and further deformed into arch shapes (cf. FIG. 5 (A)). The opened portions 38 of the divided sleeve strongly engage the inner wall of the member being fastened 14 while deforming into arch shapes inside the closed space 5. Because the flange 26 is flush against the member being fastened 14, the member being fastened 14 is strongly clamped between the opened portions 38 of the sleeve and the flange 26, and the blind rivet 21 is thereby fastened to the member being fastened 14. The blind rivet 21 is handy because it can be fastened even inside a closed space as described above. Also, even if the member being fastened that forms the closed space is a soft member, deformation in that soft member can be prevented at fastening time because the divided and opened portions of the sleeve 25 are deformed into arch shapes and engage in the inner wall of the member being fastened.

As diagrammed in FIG. 5 (A), the latching ridges 34 of the anti-dropping-off portion 33 either frictionally engage or, alternatively, bite into the inner wall surface of the hollow part 27 of the flange 26 of the rivet body 23 and the inner wall surface of the hollow part 27 of the sleeve 25. Accordingly, the portion of the mandrel 22 remaining in the rivet body 23 (that is, the portion of the mandrel between the head 29 and the breakable portion 31) is prevented from dropping out of the rivet body 23. Consequently, no noise is produced as when the mandrel portion remaining in the rivet body 23 drops out and moves inside the empty space. Also, because the portion of the mandrel remaining in the rivet body 23 is secured to the rivet body 23, that mandrel portion will be immovable relative to the rivet body 23, even when the blind rivet 21 is subjected to vibration from the member being fastened 14, and no noise resulting from vibration will be produced.

The peaks of the latching ridges 34, moreover, are formed so as to protrude slightly outwardly in the radial direction from the inner diameter of the sleeve 25 so that they frictionally engage the inner wall surface of the sleeve 25. The peaks of the latching ridges 34 are also formed in a twill pattern that covers the entire outer surface of the portion of the mandrel 22 extending from a position adjacent to the head 29 to a position adjacent to the breakable portion 31. As a consequence, after the mandrel 22 breaks, the latching ridges 34 frictionally engage with the inner wall surface of the hollow part 27 of the flange 26, the portion of the mandrel remaining in the rivet body 23 (that is, the portion of the mandrel extending from the head 29 to the breakable portion 31, inclusive of the anti-dropping-off portion 33) is prevented from dropping out of the rivet body 23, the engagement of the peaks of the latching ridges 34 with the inner wall surface of the hollow part 27 of the flange 26 of the rivet body 23 is made positive, the fastening strength of the blind rivet 21 is maintained at a high level, and the range of adaptability to changes in the thickness of the member being fastened is broadened. In addition, even during the forceful pulling-out operation when breaking the mandrel 22 at the breakable portion 31, wobble at a position adjacent to the head 29 is constrained by the peaks of the latching ridges 34 such that wobble is prevented, so the head is evenly pressed against the end surface of the sleeve 25, the end surface of the sleeve and portion adjacent thereto are uniformly deformed outwardly in the radial direction, in the circumferential direction, and failure of the fastening of the blind rivet 21 to the member being fastened is prevented.

Figure 1:
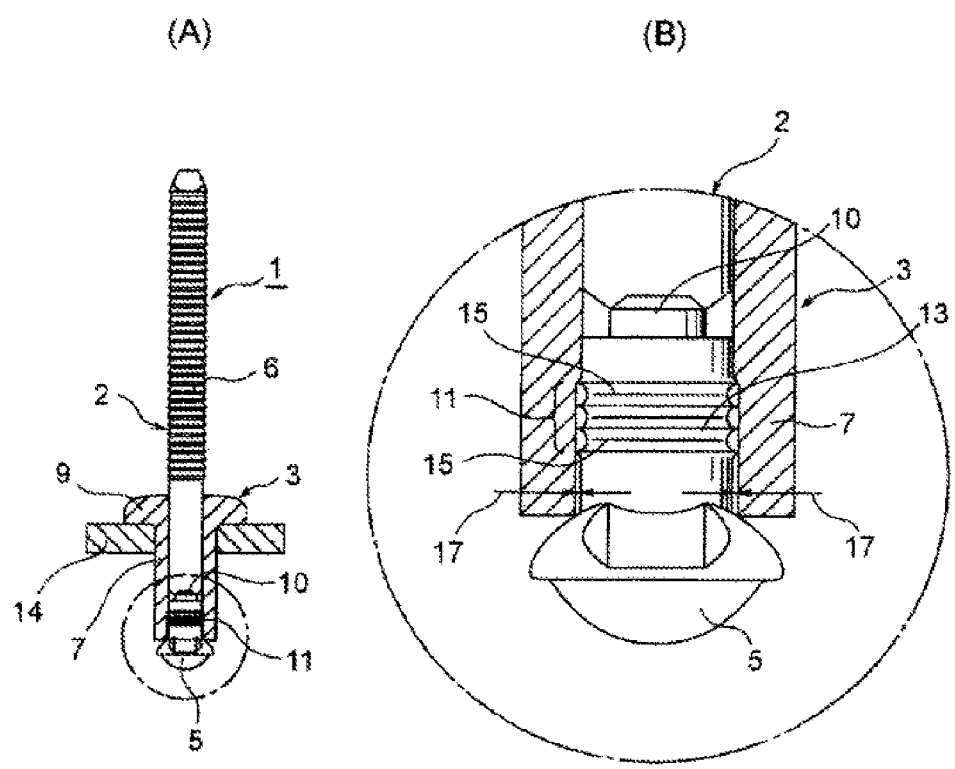
FIG. 1 shows a known blind rivet described in Patent Literature 1, wherein (A) is a partially cut-away front elevation of the blind rivet and (B) an enlarged view of the encircled portion in (A).

In contrast thereto, in the case of the known blind rivet 1, as diagrammed in FIG. 1 (B), the gap 17 is formed between the inner wall surface of the sleeve 7 and the outer surface of the mandrel 2, between the head 5 and the anti-dropping-off portion 11. When its mandrel 2 is forcefully pulled in, the head 5 readily tilts relative to the axis of the sleeve 7, causing a risk of the head 5 coming up against the end surface of the 7 in a tilted state; the head 5 will then not be evenly pressed against the end surface of the sleeve, and the end surface of the sleeve and the portion adjacent thereto will be non-uniformly deformed outwardly in the radial direction, in the circumferential direction, thereby risking failure of the fastening of the blind rivet to the member being fastened. Such fastening failures are eliminated by the blind rivet 21 of the present invention. More specifically, in the case of the blind rivet 21 as diagrammed in FIG. 4 (B), there is no gap between the peaks of the latching ridges 34 of the latching ridges 33 and the inner wall surface of the hollow part 27 of the sleeve 25 and, even during the forceful pulling-out operation when breaking the mandrel 22 at the breakable portion 31, wobble at a position adjacent to the head 29 is constrained by the latching ridges 34 such that wobble is prevented; the head 19 is thus evenly pressed against the end surface of the sleeve 25, the end surface of the sleeve and the portion adjacent thereto are uniformly deformed outwardly in the radial direction, in the circumferential direction, and failure of the fastening of the blind rivet 21 to the member being fastened is prevented.

In the case of the known blind rivet 1 as diagrammed in FIG. 5 (B), furthermore, the latching ridges 13 of the anti-dropping-off portion 11 are formed in the outer surface of the mandrel between parallel grooves 15 formed so as to encircle the outer circumferential surface in the outer circumferential direction; consequently, the length of the anti-dropping-off portion 11 in the axial direction is short. The latching ridges 13 engage with the inner wall surface of the hollow portion of the flange 9 of the rivet body 3 such that a strong fastening is obtained, but, because the length of the anti-dropping-off portion 11 is short in the axial direction, the range wherein a strong fastening is obtained is also short, causing the risk that the latching ridges 13 will not be able to engage the flange 9 due to differences in the thickness of the member being fastened. However, with the blind rivet 21 of the present invention, even when the member being fastened 14 is of considerable thickness as diagrammed in FIG. 5 (A), the latching ridges 34 of the anti-dropping-off portion 33 engage positively with the inner wall surface of the hollow portion of the flange 26 of the rivet body 23; consequently, the range of adaptability to changes in the thickness of the member being fastened is broadened.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A blind rivet, comprising:
a hollow rivet body including a tubular sleeve and a flange formed at one end of the tubular sleeve, the flange having an inner wall surface with an inner wall surface diameter; and a mandrel having a head of a diameter larger than the inner diameter of the sleeve of said rivet body, with an outer diameter that will pass through said rivet body, that is formed in a rod shape, longer than the rivet body, and provided with a grip portion at the opposite end from said head; said mandrel being assembled together with said rivet body, so that said head is disposed adjacent to the other end of said sleeve and so that said grip portion extends out from said flange; having a breakable portion of small diameter formed, in the portion of said mandrel accommodated inside said sleeve, at a position separated from said head; such that, as said grip portion is forcefully pulled out from said flange until said breakable portion thereof breaks, said head deforms said other end of said sleeve and the portion adjacent thereto, so as to widen them outwardly in the radial direction; a member being fastened is thus clamped between said deformed sleeve portion and said flange, and the blind rivet is fastened to said member being fastened; wherein:
said mandrel has an anti-dropping-off portion formed between said head and said breakable portion; in said anti-dropping-off portion, a plurality of latching ridges is formed having peaks that protrude slightly outwardly in the radial direction from the inner diameter of said sleeve and frictionally engage the inner wall surface of said sleeve ; said plurality of latching ridges is formed in the outer surface of the mandrel portion between said head and said breakable portion, diagonally relative to the circumferential direction of the outer surface of the mandrel, to mutually cross each other, with said peaks thereof formed in a twill pattern protruding out from the outer surface of said mandrel portion; in this way, by said strong pulling out of said grip portion, said peaks of said latching ridges engage the inner wall surface of said flange, even after said breakable portion has broken, said inner diameter of said inner wall surface of said flange remaining substantially constant, and the portion of the mandrel remaining in said rivet body is held inside said rivet body, without having to crimp said flange onto said locking ridges.

2. The blind rivet according to claim 1, wherein said latching ridges of said anti-dropping-off portion are formed so that said twill pattern made by said peaks covers the outer surface of said mandrel portion from an intermediate position between said head and said breakable portion to a position adjacent to said head.

3. The blind rivet according to claim 1, wherein said latching ridges of said anti-dropping-off portion are formed so that said twill pattern made by said peaks covers the outer surface of said mandrel portion from a position adjacent to said breakable portion to a position adjacent to said head.

4. The blind rivet according to claim 1, wherein said latching ridges are such that the portion of the mandrel between said head and said breakable portion is formed by at least one of a twill or diamond-shaped knurling machining.

5. The blind rivet according to claim 4, in which, in said head of said mandrel at a position opposing the other end of said sleeve, a plural number of cutting blades for making incisions in the longitudinal direction from said other end of said sleeve is formed at intervals; when said breakable portion breaks due to the forceful pulling out of said mandrel grip portion, said cutting blades can, while opening the other end of said sleeve in the longitudinal direction, then deform said other end of said sleeve and the portion adjacent thereto in order to widen them outwardly in the radial direction.

6. The blind rivet according to claim 1, wherein the head of said mandrel is formed in such a shape that, as said breakable portion breaks due to the forceful pulling out of said mandrel grip portion, the head deforms said other end of said sleeve and the portion adjacent thereto so as to expand said other end of said sleeve outwardly in the radial direction.

* * * * *